(12) United States Patent
Deason et al.

(10) Patent No.: US 9,918,209 B2
(45) Date of Patent: Mar. 13, 2018

(54) POLICIES FOR SELECTING SOURCES FOR RESOURCE STRINGS

(71) Applicant: Microsoft Technology Licensing, LLC, Redmond, WA (US)

(72) Inventors: Neil A. Deason, Kirkland, WA (US); Amer A. Hassan, Kirkland, WA (US); Carl S. Olivier, Esher (GB); Roy D. Kuntz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 14/064,926

(22) Filed: Oct. 28, 2013

(65) Prior Publication Data

US 2015/0118987 A1     Apr. 30, 2015

(51) Int. Cl.

| H04M 11/04 | (2006.01) |
|---|---|
| H04W 4/22 | (2009.01) |
| H04M 3/51 | (2006.01) |
| H04M 3/42 | (2006.01) |

(52) U.S. Cl.
CPC ......... *H04W 4/22* (2013.01); *H04M 3/42348* (2013.01); *H04M 3/5116* (2013.01); *H04M 3/42306* (2013.01); *H04M 2242/04* (2013.01)

(58) Field of Classification Search
CPC ....................................... H04W 4/22
USPC .......................................... 455/404.1, 404.2
See application file for complete search history.

(56) References Cited

U.S. PATENT DOCUMENTS

| 5,719,929 | A | 2/1998 | Menard |
|---|---|---|---|
| 7,248,853 | B1 | 7/2007 | Sakarya |
| 7,324,811 | B2 | 1/2008 | Kaibel et al. |
| 2003/0109245 | A1 | 6/2003 | Mccalmont et al. |
| 2007/0206730 | A1 | 9/2007 | Polk |
| 2011/0099281 | A1 | 4/2011 | Bakker et al. |
| 2012/0009893 | A1 | 1/2012 | Islam et al. |
| 2012/0100824 | A1 | 4/2012 | Michael |
| 2013/0012155 | A1 | 1/2013 | Forstall et al. |
| 2013/0065550 | A1 | 3/2013 | Green et al. |

FOREIGN PATENT DOCUMENTS

| EP | 2255510 | 7/2012 |
|---|---|---|
| EP | 2615796 | 7/2013 |

OTHER PUBLICATIONS

"International Search Report and Written Opinion", Application No. PCT/US2014/61660, dated Apr. 22, 2015, 10 pages.
"Cisco Extension Mobility Cross Cluster", Retrieved from: <http://www.cisco.com/en/US/docs/voice_ip_comm/cucm/admin/8_0_2/ccmfeat/fsemcc.html> on Aug. 13, 2013, May 4, 2010, 27 pages.

(Continued)

*Primary Examiner* — Charles Shedrick

(57) ABSTRACT

Techniques for policies for selecting sources for resource strings are described. Generally, a resource string refers to a set of characters that can be used to initiate communication with a particular resource. According to one or more embodiments, techniques discussed herein enable resource strings to be determined at different locations, e.g., geographic locations. In at least some embodiments, string source policies are implemented that specify parameters for selecting a source from which to obtain resource strings. According to one or more embodiments, string profiles are implemented that specify resource strings that correspond to particular resources and/or types of resources.

20 Claims, 7 Drawing Sheets

(56) References Cited

OTHER PUBLICATIONS

Rosen, et al.,' "Framework for Emergency Calling Using Internet Multimedia", In Internet Engineering Task Force, Request for Comments: 6443, Dec. 2011, 38 pages.

"Office Action Issued in European Patent Application No. 14796615.4", dated Aug. 2, 2017, 7 Pages.

"Extended European Search Report", EP Application No. 14796615.4, dated Mar. 30, 2017, 9 pages.

POLICIES FOR SELECTING SOURCES FOR RESOURCE STRINGS

BACKGROUND

Today's mobile devices provide users with a tremendous amount of portable functionality. For instance, smartphones, tablets, laptops, and so on, enable users to perform a variety of different tasks without being tied to a particular location. The ability to engage in various types of communication in a mobile scenario is particularly useful. A mobile device, for example, typically includes functionality for engaging in different types of communication with other devices and/or services, such as voice calls, video calls, messaging, and so forth. Thus, a user may leverage a mobile device to communicate with other users via a variety of different communication modalities.

While mobile devices enable communication in diverse scenarios, there are challenges to consistently enabling a user to communicate with local resources when the user moves between geographic locations. This is particularly true when a user travels to a foreign location and attempts to engage in communication (e.g., a voice call) with a resource that is local to the foreign location.

Consider, for instance, that a user travels to a foreign country. While in the foreign country, the user encounters an emergency situation and wishes to access emergency services to provide emergency assistance, such as law enforcement, emergency medical care, and so forth. The user is likely aware of how to contact emergency services in their home country, such as a phone number for dialing emergency services in their home country. The user, however, may not know how to contact emergency services in the foreign country.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for policies for selecting sources for resource strings are described. Generally, a resource string refers to a set of characters that can be used to initiate communication with a particular resource. Examples of a resource string include a dial string (e.g., a phone number), a Uniform Resource Identifier (URI), a messaging string (e.g., a short message service (SMS) number), and so forth.

According to one or more embodiments, techniques discussed herein enable resource strings to be determined at different locations. For instance, when a client device (e.g., a mobile phone) connects to a foreign network outside of a home network, techniques enable dial strings for various resources of the foreign network to be determined.

According to one or more embodiments, string source policies are implemented that specify parameters for selecting a source from which to obtain resource strings. When a client device connects to a visited network outside of its home network, available string sources can be identified. An available string source can be selected based on a string source policy, such as a highest-ranking available string source specified by the string source policy. A resource string can be obtained from the selected string source, such as a local phone number for emergency services.

According to one or more embodiments, string profiles are implemented that specify resource strings that correspond to particular resources and/or types of resources. String profiles, for example, can specify resource strings (e.g., phone numbers) for emergency services at different geographic locations. When a string source is selected (e.g., as referenced above), a string profile can be obtained by a client device from the string source and set as an active string profile for the client device. Thus, the client device can initiate communication with one or more resources based on resource strings specified by the string profile.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
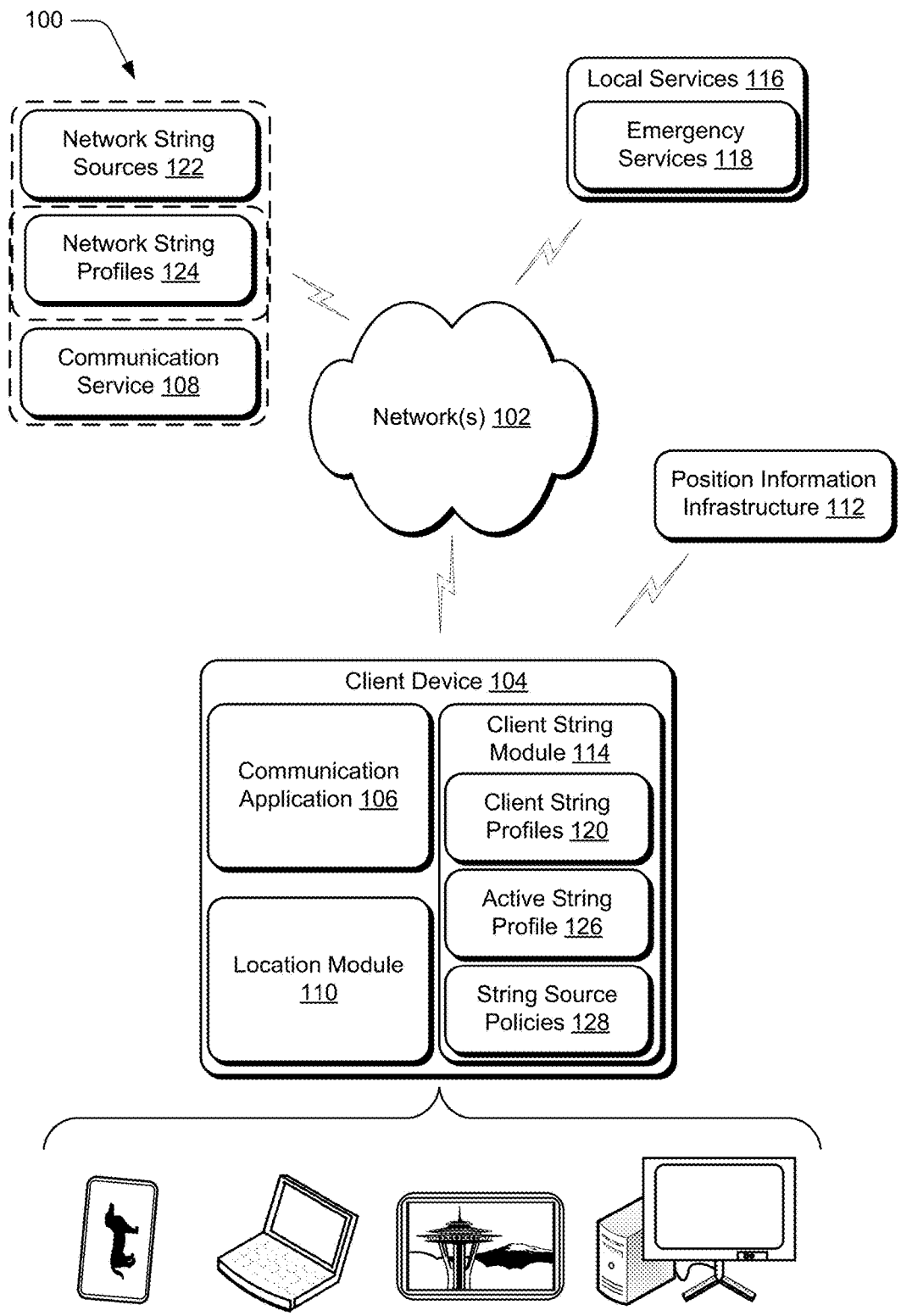
FIG. 1 is an illustration of an environment in an example implementation that is operable to employ techniques discussed herein.

Techniques for policies for selecting sources for resource strings are described. Generally, a resource string refers to a set of characters that can be used to initiate communication with a particular resource. Examples of a resource string include a dial string (e.g., a phone number), a Uniform Resource Identifier (URI), a messaging string (e.g., a short message service (SMS) number), and so forth. In at least some embodiments, a resource string refers to a phone number that can be dialed to access a particular resource, such as emergency services at a particular location. Further examples of resources and resource strings are described below.

According to one or more embodiments, techniques discussed herein enable resource strings to be determined at different locations. For instance, when a client device (e.g., a mobile phone) connects to a foreign network outside of a home network, techniques enable dial strings for various resources of the foreign network to be determined. This is particularly useful when a user travels to a foreign country where the user may be unfamiliar with local phone numbers and/or dialing conventions.

According to one or more embodiments, string source policies are implemented that specify parameters for selecting a source from which to obtain resource strings. Examples of string sources include network-based sources, user-selected sources, device default sources, and so forth. A string source policy, for instance, can specify a preference of a particular string source over other string sources, e.g., as a ranked set of string sources. When a client device connects to a visited network outside of its home network, available string sources can be identified. An available string source can be selected based on a string source policy, such as a highest-ranking available string source. A resource string can be obtained from the selected string source, such as a local phone number for emergency services.

According to one or more embodiments, string profiles are implemented that specify resource strings that correspond to particular resources and/or types of resources. String profiles, for example, can specify resource strings (e.g., phone numbers) for emergency services at different geographic locations. When a string source is selected (e.g., as referenced above), a string profile can be obtained by a client device from the string source and set as an active string profile for the client device. Thus, the client device can initiate communication with one or more resources based on resource strings specified by the active string profile.

In the following discussion, an example environment is first described that is operable to employ techniques described herein. Next, a section entitled "Example Implementation Scenario" describes an example scenario for policies for selecting sources for resource strings in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for policies for selecting sources for resource strings described herein. The environment 100 includes a communication network 102, which is representative of different connected components that exchange, process, and/or route data to enable different forms of communication. Examples of the network 102 include a local access network (LAN), wide area network (WAN), the Internet, a cellular communication network, and so forth.

Connected to the network 102 is a client device 104, which is representative of an end-user device configured to communicate via the network 102. The client device 104 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The client device 104 includes a communication application 106, which is representative of functionality to enable different forms of communication via the client device 104. Examples of the communication application 106 include a voice communication application (e.g., a VoIP client), a video communication application, a messaging application, a content sharing application, and combinations thereof. The communication application 106, for instance, enables different communication modalities to be combined to provide diverse communication scenarios. In at least some embodiments, the communication application 106 represents an application that is installed on the client device 104. Additionally or alternatively, the communication application 106 can be implemented all or in part as a remote application, such as accessed via a web browser, a web application, and so forth.

According to various embodiments, the communication application 106 is configured to enable various types of communication via interaction with a communication service 108. The communication service 108 is representative of a service to perform various tasks for management of communication between the client device 104 and other entities, e.g., other client devices. The communication service 108, for instance, can manage initiation, moderation, and termination of communication sessions for the client device 104. Examples of the communication service 108 include a VoIP service, an online conferencing service, a unified communications and collaboration (UC&C) service, and so forth. In at least some embodiments, the communication service 108 may be implemented as and/or be connected to a private branch exchange (PBX) in communication with a Public Switched Telephone Network ("PSTN") to enable voice communication between the client device 104 and other devices and/or services.

The client device 104 further includes a location module 110, which is representative of functionality (e.g., logic and/or hardware) for receiving, transmitting, and/or processing location information. The location module 110, for instance, supports transmission, reception, and processing of position information according to a variety of different technologies, such as GPS, cellular communication, WiFi™, satellite communication, radio frequency (RF) communication, subnet information, Ethernet switch and/or port data, Internet Protocol (IP) address information, and so forth.

According to various embodiments, the location module 110 can communicate with a position information infrastructure 112 to obtain position information for the client device 104. The position information infrastructure 112 is representative of various types of position information systems that can transmit and/or receive position information. Examples of the position information infrastructure 112 include GPS satellites, cellular telephone networks, wireless data (e.g., WiFi™) networks, location information services (LIS), radio frequency identifier (RFID) functionality, subnets of wired networks, Ethernet switches and/or ports, and so forth.

In at least some embodiments, the position information infrastructure 112 includes various data network components, such as wired and/or wireless data (e.g., Ethernet) switches, ports, routers, and so forth. The location module 110, for instance, can determine a location of the client device 104 based on an identity of a network and/or network component with which the client device 104 is in communication. Additionally or alternatively, the client device 104 and/or other entity can be notified of a location of the client device 104 as determined by a different resource, e.g., a Location Information Service (LIS) or other location-related service.

According to various embodiments, position information can be communicated between the location module 110 and the position information infrastructure 112 to enable a location of the client device 104 to be determined. Examples of position information include GPS coordinates, street addresses, network location, location with reference to cell towers and/or cellular base stations, and so forth.

The client device 104 further includes a client string module 114, which is representative of functionality for performing various aspects of techniques for policies for selecting sources for resource strings discussed herein. For instance, the client string module 114 can determine resource strings for communicating with local services 116, such as emergency services 118. Generally, a resource string refers to a set of characters that can be used to identify and access a particular local service 116. Examples of a resource string include a dial string (e.g., a phone number), a Uniform Resource Identifier (URI), a messaging string (e.g., a short message service (SMS) number), and so forth. A resource string, for instance, includes numbers and/or text characters that can be utilized by various entities to identify and/or route communications to the local services 116. In at least some embodiments, a resource string includes emergency dial strings for accessing the emergency services 118, such as 911, 999, 112, and so forth.

The emergency services 118 are representative of various entities that dispatch and/or provide emergency assistance. Examples of the emergency services 118 include an emergency services operator (e.g., a 911 operator), law enforcement, emergency medical services, firefighting services, and so forth.

While the local services 116 are discussed with reference to the emergency services 118, it is to be appreciated that the local services 116 can include a variety of other services. Other examples of the local services 116 include information services such as for tourist information, weather information, traffic and/or travel information, and so forth. Thus, according to one or more embodiments, the local services 116 represent any service and/or entity that is accessible via a resource string.

The client string module 114 maintains and/or has access to client string profiles 120, which are representative of different resource string profiles that specify resource strings (e.g., phone numbers) for accessing different resources, e.g., the local services 116. The client string profiles 120, for instance, map specific resource strings to specific instances of the local services 116. For example, the client string profiles 120 include resource strings for accessing emergency services 118 in a variety of different geographic locations. Further details concerning the client string profiles 120 are presented below.

The environment 100 also includes network string sources 122 and network string profiles 124. The network string sources 122 are representative of network-accessible functionality for determining and providing resource strings for the local services 116. In at least some embodiments, the network string sources 122 can be implemented by a resource such as by the communication service 108, a telephone service and/or system, a cellular network, a data network (e.g., wired and/or wireless), and so forth. Alternatively or additionally, the network string sources 122 can be implemented as a standalone service for providing resource strings and/or resource string profiles. Examples of the network string sources 122 include:

(1) A Dynamic Host Configuration Protocol (DHCP) server which can provide local network information to the client device 104. The local network information, for example, may include resource strings for the local services 116. Alternatively or additionally, a geographical location of the client device 104 can be determined from DHCP information, and can be mapped to an appropriate resource string and/or string profile for the location.

(2) A Domain Name System (DNS) server which can provide local network information to and/or about the client device 104. The DNS server, for instance, can provide network location information for the network 102. Based on the location of the network, the location of the client device 104 can be implied. A suitable resource string and/or resource string profile can be determined based on the location of the client device 104.

(3) A cellular communication system (e.g., cell towers, base stations, and so forth) can provide local resource strings and/or resource string profiles. Alternatively or additionally, a geographical location of the client device 104 can be determined based on cellular data (e.g., via cellular triangulation), and can be mapped to appropriate resource strings and/or string profiles for the location.

(4) Broadband network components (e.g., wired and/or wireless routers, switches, and so forth) can be used to provide location information that can be mapped to appropriate resource strings and/or string profiles for the location. A network component, for instance, can provide a country code that indicates a location of the component, e.g., the geographical location. One such example is location information provided by a WiFi™ 802.11d-compliant data packet.

These examples of the network string sources 122 are presented for purpose of example only, and it is to be appreciated that any service and/or resource that can be leveraged to obtain location information and/or resource string information may be employed in accordance with the disclosed embodiments.

The network string profiles 124 are representative of different network-accessible resource string profiles for determining resource strings (e.g., phone numbers) for accessing different resources, e.g., the local services 116. The network string profiles 124, for instance, map specific resource strings to specific instances of the local services 116. For example, the network string profiles 124 include resource strings for accessing emergency services 118 in a variety of different geographic locations. In at least some embodiments, the network string profiles 124 are maintained by and/or accessible to the communication service 108, the network string sources 122, and/or other network resource. Further details concerning the network string profiles 124 are presented below.

Further to techniques discussed herein, the client string module 114 maintains and/or has access to an active string profile 126 and string source policies 128. The active string profile 126 is representative of one or more resource strings that are specified to be used to access the local services 116. The active string profile 126 can be selected from various different sources, such as the network string profiles 124, the client string profiles 120, user input of a resource string, and so forth. As further detailed below, the active string profile 126 can be selected based on different criteria, such as string profile preferences, a particular location determined for the client device 104, user selection of a string profile, and so forth. Thus, when a user initiates an attempt to communicate with the local services 116, the active string profile 126 can be leveraged to determine an appropriate resource string to be used to initiate the communication.

For instance, a number that the user dials can be compared (e.g., mapped) to the active string profile 126 to determine an appropriate resource string to use to dial out from the client device 104. As detailed below for example, in some scenarios a user may dial a number that is generally known to be associated with a particular type of resource (e.g., emergency services), but that is not valid to initiate communication with the resource at a current location. Thus, the active string profile 126 can include mappings of various resource strings to valid resource strings in a particular location. Accordingly, if a user dials an invalid resource string for a resource, the invalid resource string can be mapped via the active string profile 126 to a valid resource string for the resource. The valid resource string can be used to dial the resource.

According to one or more embodiments, the string source policies 128 are representative of policies that specify parameters for selection of the active string profile 126. The string source policies 128, for instance, can specify a ranking of string profile sources that can be compared to available set of string profile sources to determine which string profile source to utilize. Based on the string source policies 128, for example, a resource string profile from a highest ranking available string profile source can be obtained and set as the active string profile 126. Further details concerning the string source policies 128 are discussed below.

As an example implementation of techniques for policies for selecting sources for resource strings discussed herein, consider that the client device 104 is a mobile device such as a smartphone. A user in possession of the client device 104 travels from their home country to a city in a foreign country. The client device 104 connects to a network in the foreign city and is configured with an emergency string that can be used to access the emergency services 118 in the foreign city. For example, the client device 104 roams to a cellular network in the foreign city and is provided by the cellular network with emergency dialing information for the foreign city. As another example, the client device 104 connects to a data network (e.g., a wireless broadband network) and receives emergency dialing information from a component of the wireless network. Thus, the emergency string is designated as part of the active string profile 126 for the client device 104. Various ways of configuring a device with emergency access information are detailed below.

Further to the example scenario, the user becomes involved in an emergency situation, such as an automobile accident. The user may be unaware of a local emergency access number, and thus uses the communication application 106 to dial an emergency services access number for the user's home country. The dialed emergency access number may not be valid in the foreign city, and thus may not be used to directly access the emergency services 118 in the foreign city. However, the dialed emergency access number is compared to the active string profile 126 and mapped to the valid emergency string specified by the active string profile 126 for the emergency services 118 in the foreign city.

Accordingly, the active string profile 126 can include mappings of known emergency strings from various different locations to an emergency string at a current location. Comparing the dialed emergency access number to the active string profile 126 thus provides an indication that the user is attempting to communicate with emergency services, and enables the dialed number to be mapped to the correct emergency string in the foreign city.

The communication application 106, for example, recognizes that the number dialed corresponds to a request for emergency services. Thus, the communication application 106 leverages the client string module 114 to map the number dialed to the emergency string specified by the active string profile 126. The communication application 106 then dials the foreign emergency string, which initiates a call to the emergency services 118 in the foreign city. The call connects the client device 104 to the emergency services 118 such that the user can request emergency assistance.

In at least some embodiments, a location of the client device 104 can be determined to assist in identifying and/or providing the local services 116. The location module 110, for instance, can determine a location of the client device 104 based on position information received from the position information infrastructure 112. The location can include geographic coordinates, a street address, and so forth. The location of the client device 104 can be leveraged for various purposes.

For instance, the location can be used to identify a valid resource string for a current location of the client device 104. Using the location, for example, a client string profile 120 and/or a network string profile 124 can be identified that corresponds to the location. An identified string profile can include resource strings for the local services 116 at the current location of the client device 104, and can be designated as part of the active string profile 126.

Further to the emergency assistance scenario discussed above, a location of the client device 104 can be used to identify a closest available emergency services 118. The location of the client device may also be provided to the emergency services 118 such that emergency assistance can be routed to the location of the client device 104.

The implementations and scenarios discussed above are presented for purpose of example only, and various other functionalities and implementation details concerning the different entities of the environment 100 are discussed below.

Having described an example environment in which the techniques described herein may operate, consider now an example implementation scenario for policies for selecting sources for resource strings in accordance with one or more embodiments.

Example Implementation Scenario

According to various embodiments, string source policies can be defined to specify preferences for obtaining string profiles to be used for an active string profile for a device. As referenced above, a string profile specifies resource strings to be used to initiate communication with a particular resource, such as the local services 116 introduced above. For instance, consider the following example implementation scenario.

Figure 2:
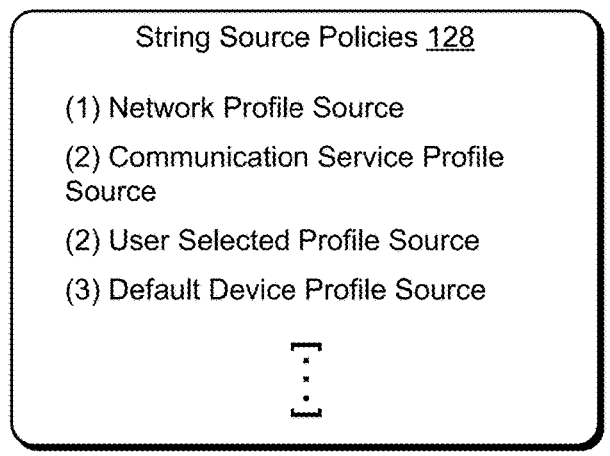
FIG. 2 illustrates an example implementation scenario in accordance with one or more embodiments.
Figure 2:
Figure 2:
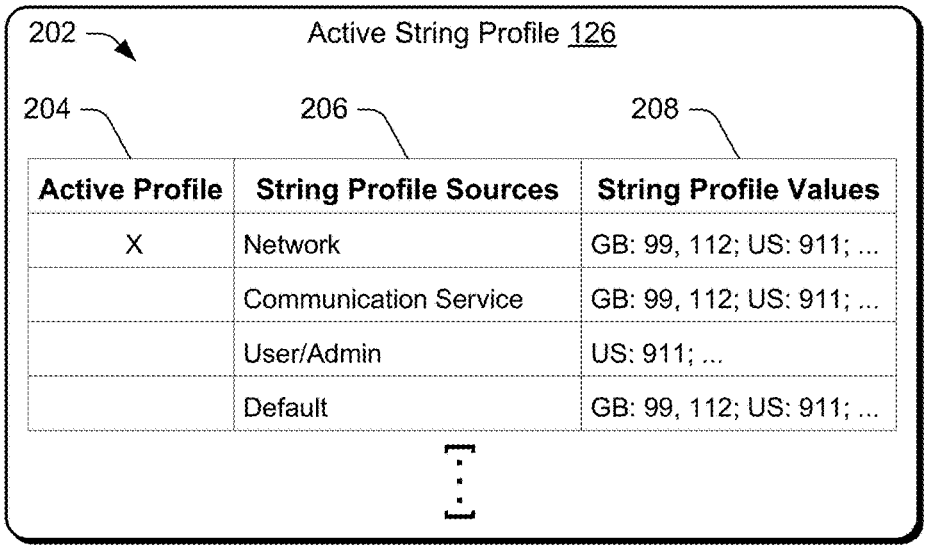

FIG. 2 illustrates an example implementation scenario 200 in accordance with one or more embodiments. The implementation scenario 200 includes the string source policies 128 introduced above. The string source policies 128 specify a ranking of string profile sources that can be leveraged to designate an active string profile. In this particular example, the string source policies 128 specify different string profile sources in descending order of preference. Preferences, for example, can be based on relative known accuracy of different string profile sources. In a given scenario where a string profile is requested, available string profile sources can be compared to the profile source ranking to determine which profile source or combination of sources to utilize to designate an active string profile. The following is a brief discussion of the listed string profile sources.

(1) Network Profile Source: This string profile source generally refers to network-based sources, such as DHCP, DNS, cellular network components, broadband data network components, a Location Information Service (LIS) and so forth. The network string sources 122, for instance, can be specified as a Network Profile Source.

(2) Communication Service Profile Source: This string profile source generally refers to string profiles maintained and/or accessible to a communication service, such as the communication service 108 introduced above. For instance, the communication application 106 on the client device 104 can obtain string profiles via the communication service 108.

(3) User Selected Profile Source: A user can expressly select a string profile and/or a profile source to be used for an active string profile. For instance, if a network profile source or a communication service profile source is not available, the user can be queried to select and/or specify a resource string profile to be used as an active string profile.

(4) Default Device Profile Source: This string profile source generally refers to default string profiles maintained by and/or stored on a device, e.g., the client string profiles 120 of the client device 104. The default device profile source, for instance, can include different string profiles that can be selected from based on a determined location for a client device. In at least some embodiments, the default device profile source can be used to specify an active string profile if a network profile source, a communication service profile source, or a user selected profile source are not available.

While the string source policy 128 is discussed above as being associated with the client device 104, this is not intended to be limiting. For instance, the string source policy 128 may be maintained by the client device 104, the communication service 108, the network string sources 122, and/or combinations thereof. Further, the string profile sources and rankings are presented for purpose of example only, and a variety of other string profile sources and/or string source rankings may be employed in accordance with one or more embodiments. Rankings of string profile sources, for example, can change based on attributes (e.g., signal strength) of available profile sources. Profile source rankings may also be user and/or administrator configurable to provide customized profile source rankings.

Further to the scenario 200, the active string profile 126 is configured based on available string profile sources and the string source policy 128. For instance, a set of string profile sources that are determined to be available is compared to the ranking of string profile sources included in the string source policy 128. A highest-ranking string profile source is selected from the available sources.

In this particular example, the active string profile 126 includes a string profile table 202, which tracks various data for string profiles. For instance, the string profile table 202 includes an active profile column 204, which identifies a string profile which is currently designated as the active string profile 126. The string profile table 202 further includes a profile sources column 206, which specifies different string profile sources. In at least some embodiments, the profile sources column 206 lists string profile sources that are currently available from which to obtain string profiles.

The string profile table 202 also includes a profile values column 208 that lists various string values for the corresponding string profile sources. The profile values column 208, for example, lists different resource strings for different resources and/or resource types, such as for the local services 116 introduced above. In this particular example, the profile values column 208 lists emergency strings that are specified by the different profiles of the profile sources column 206.

As indicated in the active profile column 204, a network string profile is designated as the active string profile 126. The network string profile, for instance, corresponds to a highest-ranking available string profile from the string source policies 128. Thus, communications to network resources (e.g., the local services 116) can be initiated using resource strings from the network string profile.

In at least some embodiments, string mapping can occur among various string profiles. For instance, consider that a user dials an emergency resource string from a string profile that is not designated as the active string profile 126. The user, for example, dials an emergency resource string for the communication service profile, the user/admin profile, the default client profile, and so forth. Techniques discussed herein can detect that the user is attempting to initiate communication with emergency services, and thus can map the dialed emergency resource string to the active emergency resource string for the active string profile 126. The active emergency resource string can be dialed to initiate communication with emergency services, e.g., the emergency services 118. Thus, a dialed emergency resource string that may not otherwise be valid to access emergency services at a particular location can be mapped to a valid (e.g., active) emergency resource string for the particular location.

Having discussed an example implementation scenario, consider now a discussion of some example procedures in accordance with one or more embodiments.

Example Procedures

The following discussion describes some example procedures for policies for selecting sources for resource strings in accordance with one or more embodiments. The example procedures may be employed in the environment 100 of FIG. 1, the system 700 of FIG. 7, and/or any other suitable environment. In at least some embodiments, the steps described for the various procedures can be implemented automatically and independent of user interaction. Further, various steps of the procedures may be performed by a client, such as the client device 104. Additionally or alternatively, steps may be performed on a network side, such as by the communication service 108 and/or the network string sources 122.

Figure 3:
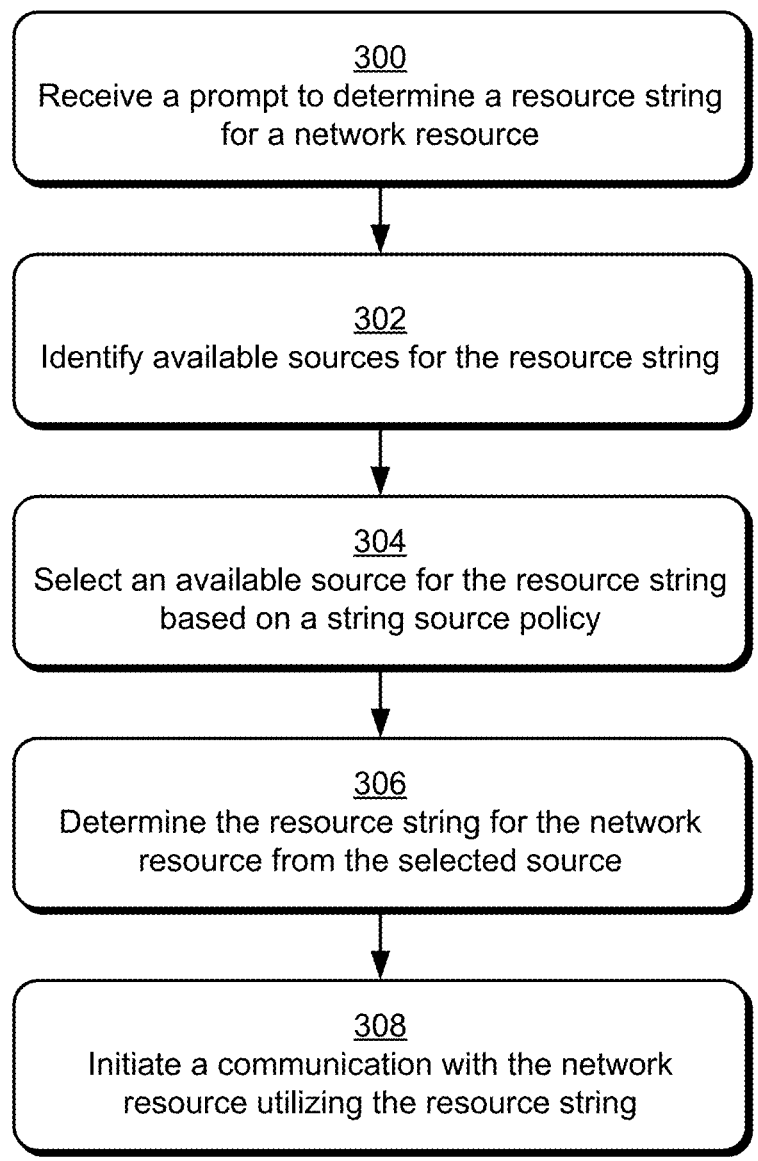
FIG. 3 is a flow diagram that describes steps in a method in accordance with one or more embodiments.

FIG. 3 is a flow diagram that describes steps in a method in accordance with one or more embodiments. In at least some embodiments, the method describes an example way of dynamically determining a resource string based on various conditions, such as travel between different locations.

Step 300 receives a prompt to determine a resource string for a network resource. As referenced above, a resource string generally refers to a string of characters that can be used to identify and/or access a particular network resource. Examples of a resource string include a phone number (e.g., a dial string), a URI (e.g., a Session Initiation Protocol (SIP) URI), and so forth. Examples of the network resource include emergency services, as well as other types of network-accessible services and/or resources.

The prompt to determine the resource string can be received according to a variety of different scenarios. For instance, the client device 104 can receive an indication that the client device has roamed outside of its home network to a visited network. Connecting to the visited network can serve as a prompt that the client device 104 is to determine a resource string for resources associated with the visited network, such as local emergency services. Thus, a change in location of a client device can initiate a procedure for determine a resource string for a local network resource.

Additionally or alternatively, the prompt may occur in response to user input. For instance, a user can expressly request a resource string, such as a phone number for local services. As another example, a user may dial a resource string that is invalid at a particular location, thus initiating a procedure to determine a valid resource string at the location.

In at least some embodiments, the prompt may be generated by a network service. For instance, the communication service 108 can determine that the client device 104 has moved outside of its home network to a visited network, and can thus initiate a procedure for determining one or more resource strings for resources of the visited network.

Step 302 identifies available sources for the resource string. Examples of resource string sources are discussed at length above, and include network sources, user and administrator based sources, device default sources, and so forth.

Identifying available sources for resource strings can include determining which sources are available to provide resource strings. With reference to the string profiles discussed above, for example, the client device 103 and/or the communication service 108 can determine which of the string profile sources are currently available and have string profiles to provide.

Step 304 selects an available source for the resource string based on a string source policy. The available sources for resource strings, for instance, can be compared to a string source policy that specifies preferences for different string sources. A most preferred (e.g., highest ranked) available string source can be selected. Some string sources specified by the string source policy may not be available, and thus are not considered in selecting a source for the resource string.

Step 306 determines the resource string for the network resource from the selected source. For example, the resource string can be retrieved from the selected source. With reference to the string profiles discussed above, for instance, a string profile can be retrieved from the selected string source and set as the active string profile. Thus, resource strings from the active string profile can be used to initiate communication with (e.g., dial) various network resources.

Step 308 initiates a communication with the network resource utilizing the resource string. For instance, a communication session with one of the local services 116 discussed above can be initiated using the resource string. In an emergency situation, for example, a resource string for emergency services can be dialed (e.g., via the communication application 106) to initiate communication with the emergency services 118.

Having discussed an example general procedure for policies for selecting sources for resource strings, consider now a detailed example procedure in accordance with one or more embodiments.

Figure 4:
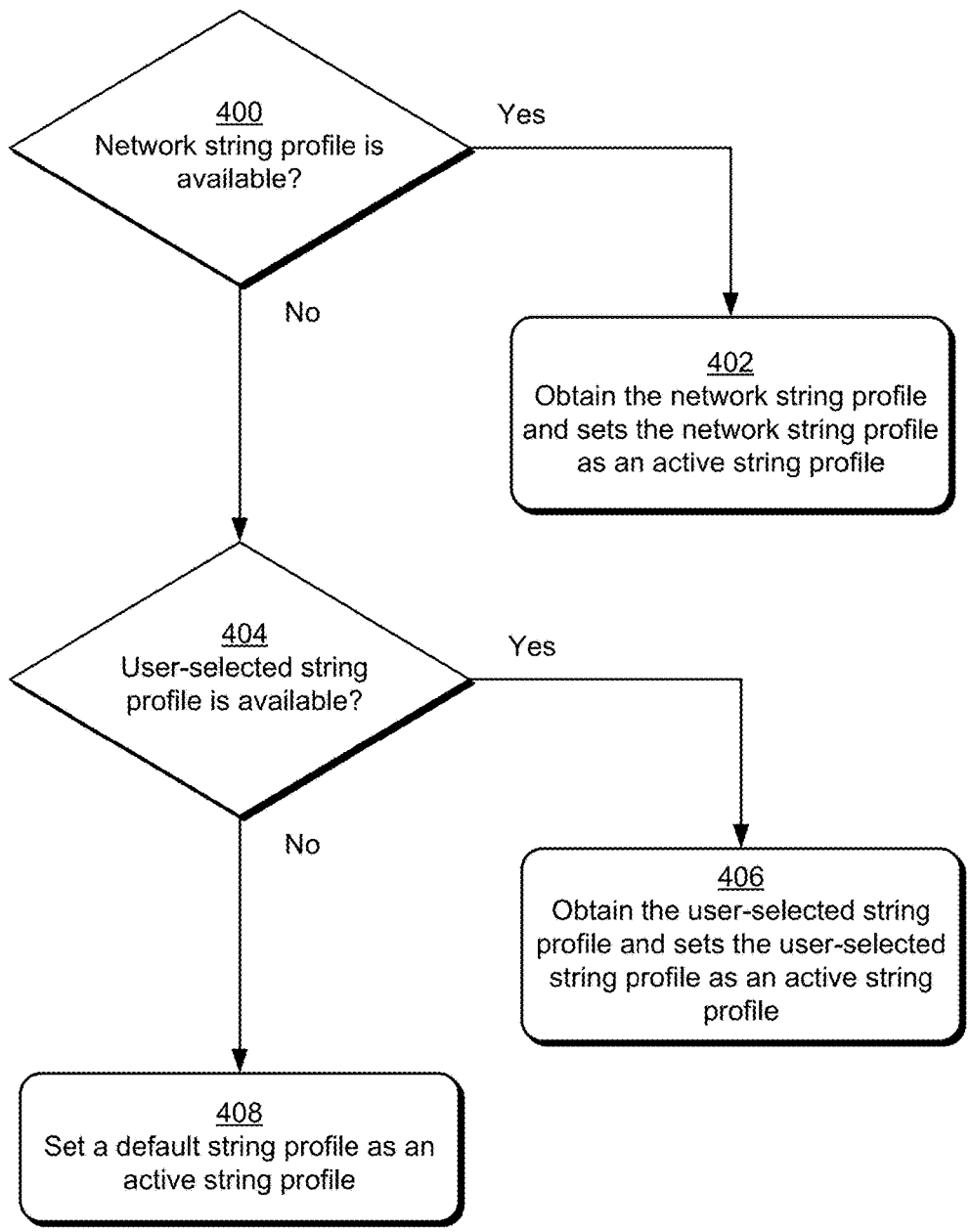
FIG. 4 is a flow diagram that describes steps in a method in accordance with one or more embodiments.

FIG. 4 is a flow diagram that describes steps in a method in accordance with one or more embodiments. The method, for instance, describes an example way of selecting a source for determining a resource string profile. In at least some embodiments, the method can be implemented via the client device 104 and/or the communication service 108.

Step 400 ascertains whether a network string profile is available. A network string profile, for instance, can be obtained from a network source, such as from a DHCP server, DNS, network hardware components, and so forth.

If a network string profile is available ("Yes"), step 402 obtains the network string profile and sets the network string profile as an active string profile. A network source, for instance, can be queried for the network string profile. Alternatively or additionally, a network source can push the network string profile out to a device and/or service, such as independent of a query for the profile.

If a network string profile is not available ("No"), step 404 determines whether a user-selected string profile is available. A user, for example, can pre-select a resource string profile to be used for initiating communication with network resources. Alternatively or additionally, a user can be queried to select a resource string profile in response to a determination that a network source is not available.

In at least some embodiments, a user-selected string profile can be location-specific, such as based on a particular geographic region. A user, for example, can be presented with multiple string profiles that each correspond to a different geographic region. The user can select the string profile that most closely matches their current location, e.g., a geographical region in which the user is situated. As used herein, the term "user" may refer to an end-user of a client device, and/or an administrator that configures various device-related attributes.

If a user-selected string profile is available ("Yes"), step 406 obtains the user-selected string profile and sets the user-selected string profile as an active string profile. The user-selected string profile can be obtained from a remote resource, such as a remote storage location. Alternatively or additionally, the user-selected string profile can be obtained from a local source, such as a storage location on a client device.

If a user-selected string profile is not available ("No"), step 408 sets a default string profile as an active string profile. The default string profile, for instance, corresponds to a local string profile that is stored on and/or accessible to a device. For example, the default string profile can correspond to a fallback string profile that is utilized when other string profiles are not available.

In at least some embodiments, the method discussed above represents an application of a particular set of string source policies, e.g., the string source policies 128 discussed above. For instance, the method represents an iteration through a ranked set of string sources to determine a highest-ranking available string source from which to obtain a string profile.

According to various embodiments, a resource string profile can be determined based on a location of a device. For instance, consider the following example method.

Figure 5:
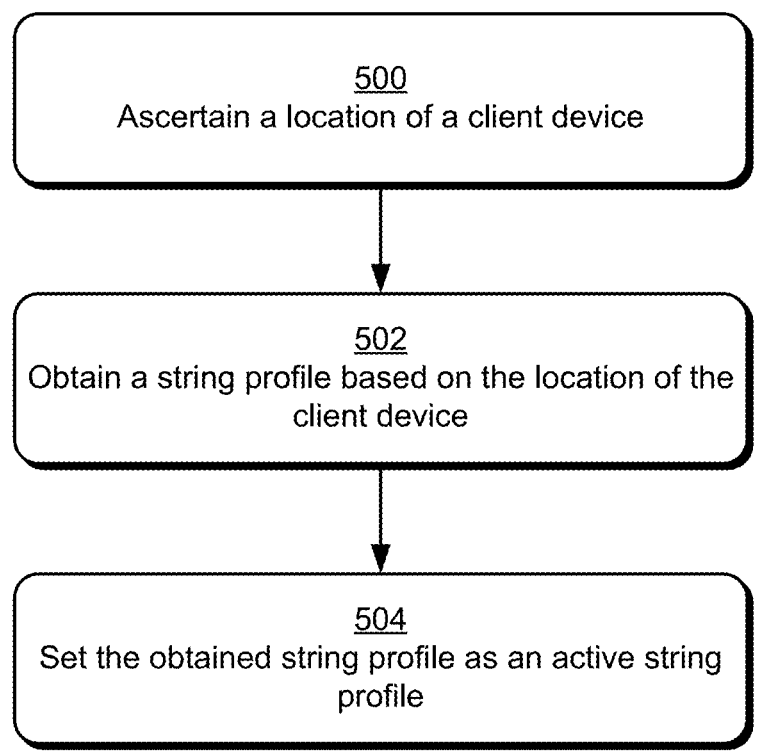
FIG. 5 is a flow diagram that describes steps in a method in accordance with one or more embodiments.

FIG. 5 is a flow diagram that describes steps in a method in accordance with one or more embodiments. Step 500 ascertains a location of a client device. For instance, the location of the client device can be automatically determined, such as by the location module 110 of the client device 104. Alternatively or additionally, a user can be prompted to enter a location. A graphical user interface (GUI), for example, can be presented that prompts the user to enter a location of the client device. The location can be entered in various ways, such one or more of a street address, a city, a state, a country, geographical coordinates, and so forth.

In at least some embodiments, the location may refer to a network location and/or a services-based location. For instance, the location may correspond to a particular network to which a device is connected.

Step 502 obtains a string profile based on the location of the client device. Multiple location-specific string profiles can be searched, for instance, and a string profile that corresponds to the location of the client device can be selected.

Step 504 sets the obtained string profile as an active string profile. Resource strings from the active string profile can be used to initiate communication with network resources.

In at least some embodiments, the method described above can be implemented as a client-side implementation and/or a server-side implementation, such as an interaction between the communication application 106 on the client device 104 and the communication service 108. The method may be implemented to update an active string profile when a user travels outside of their home network, and/or to reset an active string profile to a home network string profile when the user returns to their home network from an outside network. For example, the method may be implemented automatically and in response to a client device traveling outside of a region associated with a current active profile.

Figure 6:
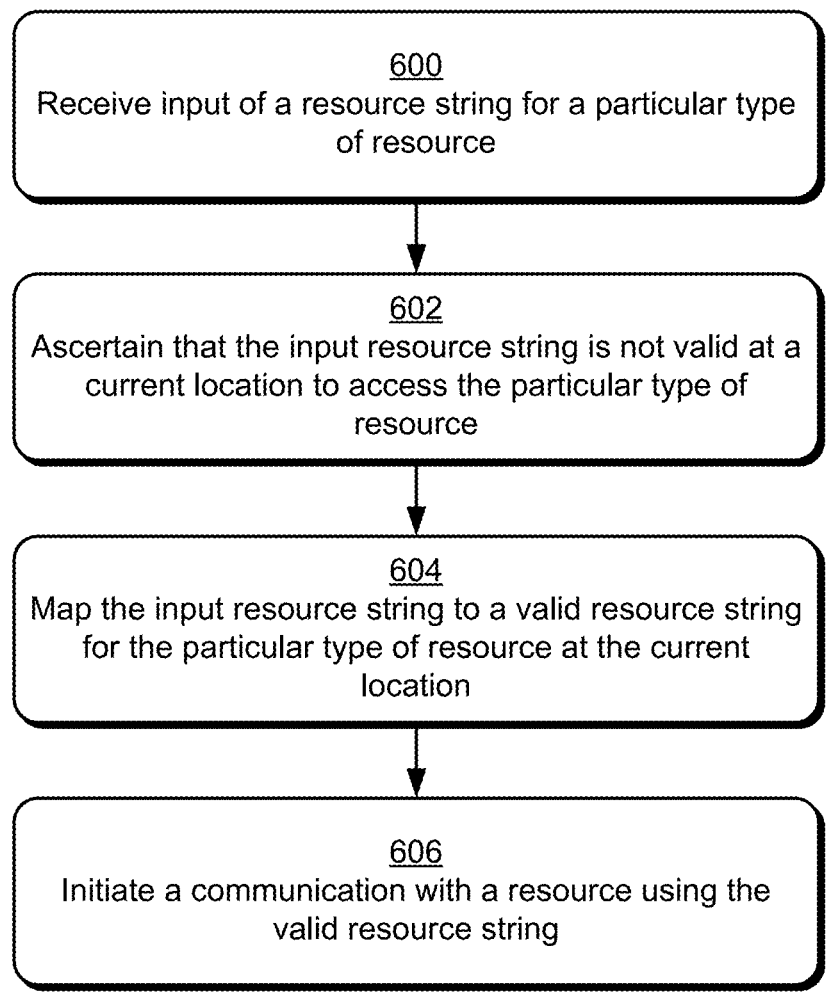
FIG. 6 is a flow diagram that describes steps in a method in accordance with one or more embodiments.

FIG. 6 is a flow diagram that describes steps in a method in accordance with one or more embodiments. In at least some embodiments, the method describes an example way of mapping resource strings.

Step 600 receives input of a resource string for a particular type of resource. For instance, a user may dial a phone number for a particular type of resource, such as an emergency resource. The user may manually enter a phone number, or may select an icon or other indicia that represents the particular type of resource.

As an example implementation, consider a scenario where a user travels from the United States (US) to London and encounters an emergency situation. The user may not know the local emergency access number in London (e.g., 112), and thus dials 911 as the user would do in the US.

Step 602 ascertains that the input resource string is not valid at a current location to access the particular type of resource. For instance, consider that a user of the client device 104 inputs a phone number for emergency assistance via the communication application 106. The communication application 106 can transmit the phone number to the communication service 108 as a request to initiate communication with emergency services. The communication service 108 can determine that the phone number is not valid at the current location of the client device 104 to initiate communication with emergency services. Alternatively, the communication application 106 can itself determine locally that based on a current location of the client device 104, the phone number is not valid to initiate communication with emergency services.

As yet another example, the input string can be dialed to initiate a call with a local PSTN at the current location. The PSTN can return an indication that call has failed, such as an error message specifying that the number is not valid at the current location.

Continuing with the example scenario, the communication application 106 and/or the communication service 108 recognizes that 911 corresponds to a request to communicate with emergency services, and that 911 is not valid in London to initiate communication with emergency services. For instance, a default/home string profile that is not currently active for the client device 104 may specify that 911 corresponds to a request for emergency services. The communication application 106/communication service 108 determines that the home string profile is not currently active, that a different string profile is active, and thus that a resource string from the different string profile is to be used to contact emergency services.

Step 604 maps the input resource string to a valid resource string for the particular type of resource at the current location. The input resource string, for instance, can be mapped to a resource string specified by an active string profile for the resource type. Further to the ongoing example scenario, 911 can be mapped to a valid resource string for emergency services in London, e.g., 112. In at least some embodiments, mapping can include mapping to a resource string indicated by an active string profile for the resource type. As referenced above, an active string profile can include mappings of different resource strings to different types of resources. An active string profile, for example, can specify that 911, 112, 999, and so forth, all correspond to emergency services. Thus, whichever resource string is dialed can be mapped to a valid resource string for emergency services at the current location.

Step 606 initiates a communication with a resource using the valid resource string. The valid resource string, for instance, can be automatically dialed to initiate communication with an instance of a resource that corresponds to the resource type. Alternatively, a user may be notified of the valid resource string to enable the user to enter the valid resource string for initiating communication with the resource.

Continuing with the example scenario, the valid phone number for emergency services in London (e.g., 112) can be dialed, either automatically and independent of further user input, or via user input. Thus, communication with the emergency services can be initiated.

Having discussed some example procedures, consider now a discussion of an example system and device in accordance with one or more embodiments.

Example System and Device

Figure 7:
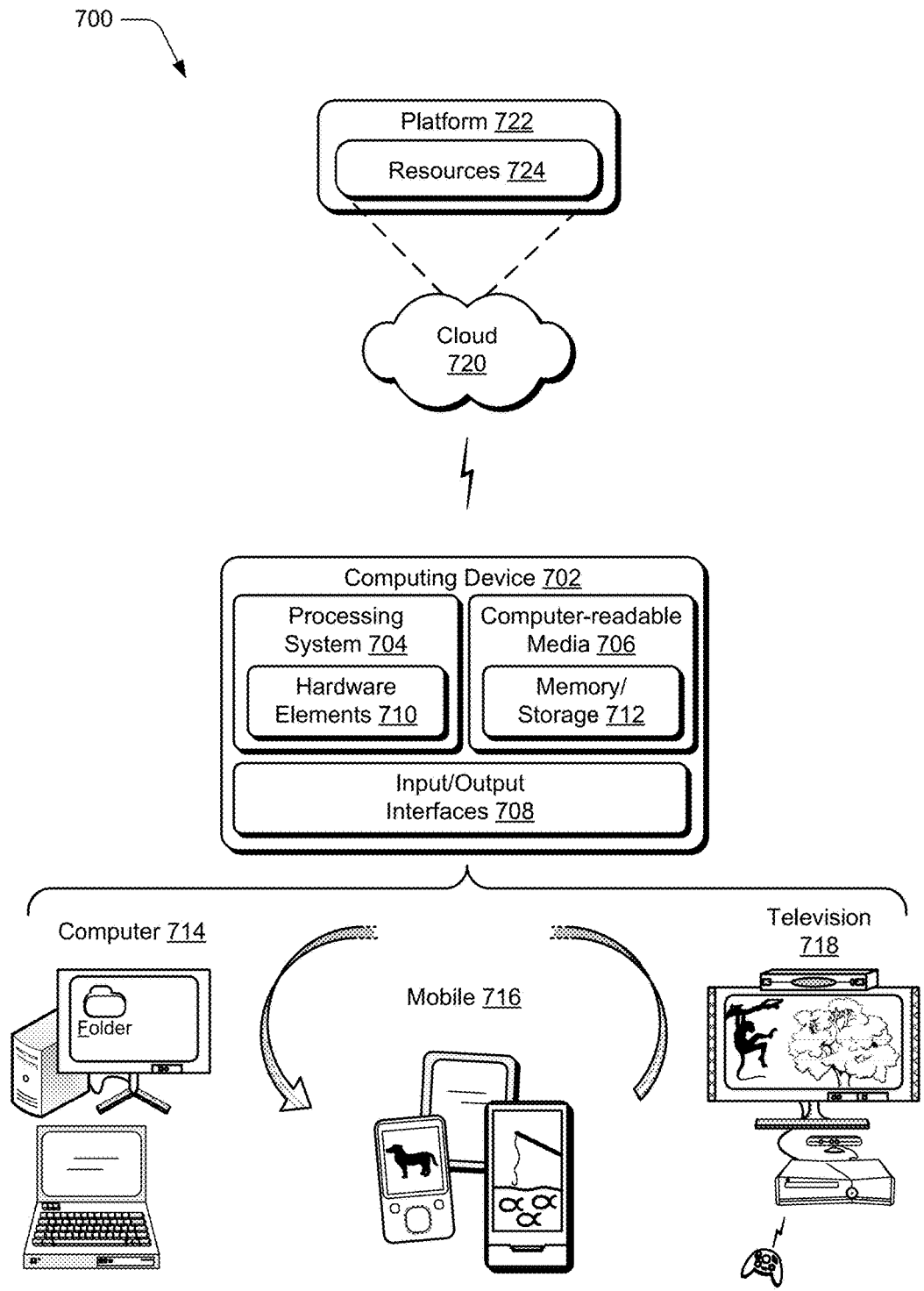
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement various techniques described herein. For example, the client device 104 discussed above with reference to FIG. 1 can be embodied as the computing device 702. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more Input/Output (I/O) Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules that are executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, functionalities discussed with reference to various entities of the environment 100 may be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for policies for selecting sources for resource strings are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system perform operations including:
      receiving a prompt to determine a resource string for a network resource;
      identifying available sources for the resource string, the available sources including a local source that resides on a client device and a remote source that resides remote from the client device; and
      selecting an available source for the resource string from among the local source or the remote source based on a string source policy that specifies a ranking for the local source and a ranking for the remote source, said selecting including selecting either the local source or the remote source based on which source has a higher ranking.

2. A system as recited in claim 1, wherein the resource string comprises one or more of a phone number or a Uniform Resource Identifier (URI) for the network resource.

3. A system as recited in claim 1, wherein the network resource comprises an emergency service.

4. A system as recited in claim 1, wherein said receiving the prompt occurs in response to one or more of:
   receiving an indication that the client device roams outside of a home network;
   user input requesting the resource string; or
   user input of an invalid resource string for the network resource.

5. A system as recited in claim 1, wherein the available sources for the resource string comprise at least some of a network resource, a communication service, a user-selected resource, or a default resource for the client device.

6. A system as recited in claim 1, wherein the operations further comprise setting a string profile from the selected available source as an active string profile for the client device.

7. A system as recited in claim 1, wherein the operations further comprise:
   retrieving the resource string from the selected available source; and
   initiating communication with the network resource via the resource string.

8. A method as described in claim 1, wherein the available string sources comprise at least some of a network string source, a user-selected string source, or a default string source for the client device.

9. A computer-implemented method, comprising:
   selecting for a client device an available source for a resource string from available string sources that include a local source and a remote source based on a string source policy that specifies a higher ranking for either the local source or the remote source, the local source residing on the client device and the remote source residing remote from the client device, and said selecting including selecting either the local source or the remote source based on which source has a higher ranking;

determining a resource string for a network resource from the selected string source; and initiating a communication between the client device and the network resource utilizing the resource string.

10. A method as described in claim 9, wherein said selecting occurs in response to the client device roaming from a home network to a visited network associated with the network resource.

11. A method as described in claim 9, wherein one or more of said selecting, said determining, or said initiating are performed via Voice over Internet Protocol (VoIP) functionality associated with the client device.

12. A method as described in claim 9, wherein the resource string comprises a resource string for an emergency service, and wherein said initiating comprises initiating a call to the emergency service.

13. A method as described in claim 9, further comprising:
retrieving a string profile from the selected string source that includes a mapping of the resource string to the network resource; and
setting the string profile as an active string profile for the client device.

14. One or more computer-readable storage media having instructions stored thereon that, responsive to execution by at least one processor, cause the at least one processor to perform operations comprising:
receiving a prompt to determine a resource string for a network resource;
identifying available sources for the resource string, the available sources including a local source that resides on a client device and a remote source that resides remote from the client device; and
selecting an available source for the resource string from among the local source or the remote source based on a string source policy that specifies a higher ranking for either the local source or the remote source, said selecting including selecting either the local source or the remote source based on which source has a higher ranking.

15. One or more computer-readable storage media as recited in claim 14, wherein the resource string comprises one or more of a phone number or a Uniform Resource Identifier (URI) for the network resource.

16. One or more computer-readable storage media as recited in claim 14, wherein the network resource comprises an emergency service.

17. One or more computer-readable storage media as recited in claim 14, wherein the local source that resides on the client device includes a default device source or a user selected source.

18. One or more computer-readable storage media as recited in claim 14, wherein the remote source that resides remote from the client device includes a communication service source or a network source.

19. A system as recited in claim 1, wherein the operations further include:
setting a string profile from the selected available source as an active string profile for the client device;
determining that a first resource string is dialed from a different string profile that is not the active string profile;
mapping the first resource string to a second resource string from the active string profile; and
initiating communication via the second resource string.

20. One or more computer-readable storage media as recited in claim 14, wherein the operations further comprise:
setting a string profile from the selected available source as an active string profile for the client device;
determining that a first resource string is dialed from a different string profile that is not the active string profile;
mapping the first resource string to a second resource string from the active string profile; and
initiating communication via the second resource string.

* * * * *